(12) United States Patent
Chen et al.

(10) Patent No.: US 8,872,991 B2
(45) Date of Patent: Oct. 28, 2014

(54) DISPLAY DEVICE AND DISPLAY ARRAY SUBSTRATE

(75) Inventors: Jia-Hung Chen, Hsinchu (TW); Pei-Ju Chou, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 13/455,246

(22) Filed: Apr. 25, 2012

(65) Prior Publication Data

US 2012/0281159 A1　Nov. 8, 2012

(30) Foreign Application Priority Data

May 2, 2011　(TW) .............................. 100115365 A

(51) Int. Cl.
　　*G02F 1/1333*　(2006.01)
　　*G09G 3/36*　(2006.01)
　　*G02F 1/1345*　(2006.01)

(52) U.S. Cl.
　　CPC .......... *G09G 3/3648* (2013.01); *G09G 2330/04* (2013.01); *G09G 2330/06* (2013.01); *G02F 1/1345* (2013.01)
　　USPC .......................................................... 349/40

(58) Field of Classification Search
　　CPC ............................................... G02F 1/136204
　　USPC .......................................................... 349/40
　　See application file for complete search history.

(56) References Cited

U.S. PATENT DOCUMENTS

| 4,626,073 A * | 12/1986 | Amstutz et al. ................ 349/155 |
| 2006/0139556 A1* | 6/2006 | Ahn et al. ...................... 349/153 |
| 2006/0164564 A1* | 7/2006 | Choi et al. ....................... 349/33 |
| 2009/0153453 A1* | 6/2009 | Lu et al. ........................... 345/87 |
| 2009/0231532 A1* | 9/2009 | Yoshida ......................... 349/151 |
| 2009/0244421 A1* | 10/2009 | Ishii et al. ........................ 349/40 |
| 2009/0310051 A1* | 12/2009 | Kim ................................. 349/40 |
| 2010/0163284 A1* | 7/2010 | Tanahara ....................... 174/255 |

FOREIGN PATENT DOCUMENTS

| CN | 1964055 A | 5/2007 |
| CN | 101236315 A | 8/2008 |
| CN | 101285974 A | 10/2008 |
| TW | 200532306 A | 10/2005 |
| TW | 200612230 A | 4/2006 |
| TW | 200831990 A | 8/2008 |
| TW | 201000998 A | 1/2010 |

OTHER PUBLICATIONS

Taiwan Patent Office, "Office Action", Dec. 23, 2013.
China Patent Office, "Office Action", Jun. 5, 2014.

\* cited by examiner

*Primary Examiner* — Dennis Y Kim
(74) *Attorney, Agent, or Firm* — WPAT, PC; Justin King

(57) ABSTRACT

A display device comprises a display array substrate, a common substrate and a display layer. The display array substrate comprises a display region and a periphery region, and at least one chip-bonding area is formed in the periphery region. The display layer is sandwiched between the display array substrate and the common-electrode substrate. A conductive loop is disposed in the periphery region of the display array substrate, and passes through the chip-bonding area.

7 Claims, 3 Drawing Sheets

DISPLAY DEVICE AND DISPLAY ARRAY SUBSTRATE

FIELD OF THE INVENTION

The present invention relates to the display field, and more particularly to a display device and a display array substrate thereof which can avoid the ESD (electro-static discharge) damage.

BACKGROUND OF THE INVENTION

Currently, display device, such as liquid crystal display (LCD) device has many advantages, such as high definition, environmental protection, low power-consumption, little radiation, etc., and it has been a trend of the market. The LCD device generally includes a display array substrate (also called as a thin-film transistor (TFT) array substrate), a common-electrode substrate and a liquid crystal display layer sandwiched between the display array substrate and the common-electrode substrate. The display array substrate includes a plurality of scan lines, a plurality of data lines, a plurality of pixel electrodes and a plurality of pixel transistors, etc., which are manufactured by the semiconductor manufacturing technology. The common-electrode substrate includes a common electrode formed thereon, and the common electrode cooperates with the pixel electrodes together to drive liquid crystal molecules of the liquid crystal display layer.

The ESD damage of the LCD device generally takes place in the manufacturing process of the LCD device, such as an array manufacturing period, a cell manufacturing period and a module manufacturing period, etc. It may design conductive lines on the substrates for discharging electro-static charges to reduce the ESD damage in the array and cell manufacturing periods. However, it only may use machine tables or operation people to reduce the ESD damage in the module manufacturing period. Thus, the ESD damage often take places in IC pads or between two ICs during the module manufacturing period, and it will reduce the yield thereof.

SUMMARY OF THE INVENTION

Therefore, the present invention relates to a display device and a display array substrate which can uniformly distribute electro-static charges to protect the display device and the display array substrate from the ESD damage.

In an exemplary embodiment of the present invention provides a display device which includes a display array substrate, a common substrate and a display layer. The display array substrate includes a display region and a periphery region, and at least one chip-bonding area is formed in the periphery region. The display layer is sandwiched between the display array substrate and the common-electrode substrate. A conductive loop is disposed in the periphery region of the display array substrate, and passes through the chip-bonding area.

In an exemplary embodiment of the present invention, the chip-bonding area is electrically coupled to the display region through a plurality of conductive lines which are arranged in a fan-out shape, and the conductive loop is not electrically coupled to the conductive lines.

In an exemplary embodiment of the present invention, at least one driving chip is disposed in the at least one chip-bonding area respectively. The driving chip is electrically coupled to the conductive lines which are arranged in the fan-out shape, and the driving chip is a gate-driving chip or a source-driving chip.

In an exemplary embodiment of the present invention, a common electrode is formed on the common-electrode substrate, and the conductive loop is electrically coupled to the common electrode.

In an exemplary embodiment of the present invention, a storage capacitance is formed in the display region. The common electrode is electrically coupled to the storage capacitance through conductive silver glue, and the conductive loop is electrically coupled to the common electrode through the conductive silver glue.

In an exemplary embodiment of the present invention, the common-electrode substrate is bonded with the display array substrate by conductive rubber, and the conductive loop is electrically coupled to the common electrode through the conductive rubber.

In an exemplary embodiment of the present invention, the conductive loop surrounds the display region.

In an exemplary embodiment of the present invention also provides a display array substrate, which includes a display region, a periphery region and a conductive loop. The periphery region surrounds the display region, and at least one chip-bonding area is formed in the periphery region. The conductive loop is formed in the periphery region and passes through the chip-bonding area.

The display device and the display array substrate of the exemplary embodiment of the present invention dispose the conductive loop in the periphery region of the display array substrate, and the conductive loop passes through the chip-bonding area, to conduct the electro-static charges accumulated somewhere of the display array substrate to the whole display array substrate. Thus the electro-static charges may be uniformly distributed in the whole display array substrate, to reduce the ESD damage for IC and other lines of the display array substrate. In addition, the conductive loop may be further electrically coupled to the common-electrode substrate, for further conducting the electro-static charges to the common electrode which may be an unbroken piece, to further enhance the ESD protection.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
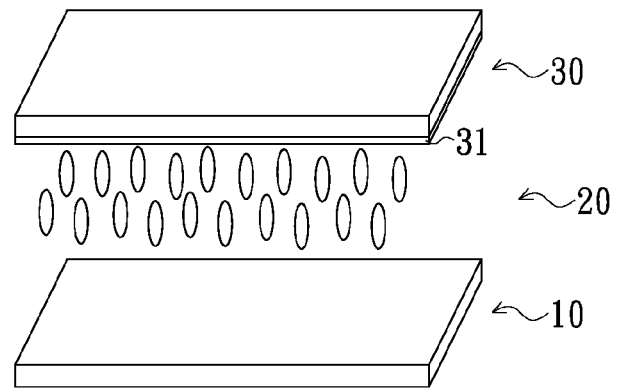
FIG. 1 is an exploded schematic view of a liquid crystal display (LCD) device in accordance with an exemplary embodiment of the present invention.

FIG. 1 is an exploded schematic view of a liquid crystal display (LCD) device in accordance with an exemplary embodiment of the present invention. Referring to FIG. 1, the LCD device includes a display array substrate 10 (also called as a thin-film transistor (TFT) array substrate), a common-electrode substrate 30 opposite to the display array substrate 10, and a liquid crystal display layer 20 sandwiched between the display array substrate 10 and the common-electrode substrate 30. A common electrode 31 is formed on a side of the common-electrode substrate 30 adjacent to the liquid crystal display layer 20. The common electrode 31 is made of transparent conductive material, such as Indium Tin Oxide (ITO) or Indium Zn Oxide (IZO), etc. The liquid crystal display layer 20 may be manufactured by pouring liquid crystal material between the display array substrate 10 and the common-electrode substrate 30. It should be noted that, the exemplary embodiment of the present invention only employs the LCD device as an example for describing the present invention, and the present invention is not limited herein. For example, the LCD device may be altered by an electronic-paper display device. Correspondingly, the liquid crystal display layer 20 may be altered by an electronic-paper display layer, such as a micro-capsule type electronic-paper display layer, a micro-cup type electronic-paper display layer, or a liquid-powder type electronic-paper display layer.

Figure 2:
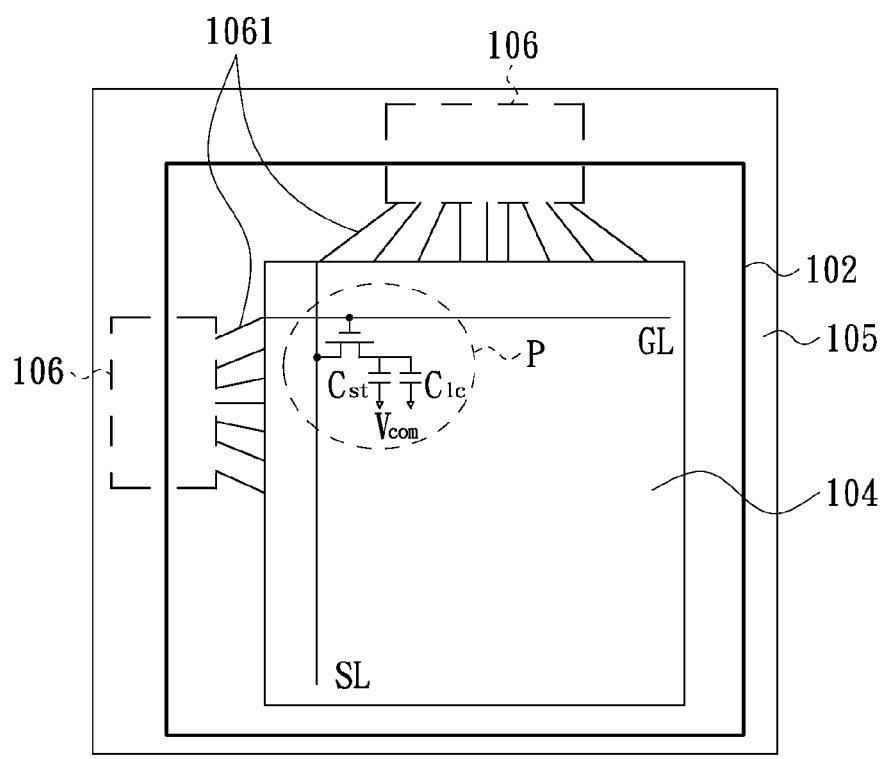
FIG. 2 is a top schematic view of a display array substrate in accordance with an exemplary embodiment of the present invention.

FIG. 2 is a top schematic view of a display array substrate in accordance with an exemplary embodiment of the present invention.

Referring to FIG. 2, the display array substrate 10 includes a display region 104 and a periphery region 105 surrounding the display region 104.

A plurality of gate lines GL, a plurality of data lines SL, and a plurality of pixels P electrically coupled to the gate lines GL and the data lines SL, are disposed in the display region 104. The gate lines GL and the data lines SL are intersected therewith. FIG. 2 only shows a gate line GL, a data line SL and a pixel P as an example. In detail, as shown in FIG. 2, the pixel P includes a transistor, a storage capacitance Cst and a liquid crystal capacitance Clc. A gate terminal of the transistor is electrically coupled to the gate line GL, a source/drain terminal of the transistor is electrically coupled to the data line SL, and another source/drain terminal of the transistor is electrically coupled to a terminal of the storage capacitance Cst and a terminal of the liquid crystal capacitance Clc. Another terminal of the liquid crystal capacitance Clc is configured for receiving a common voltage Vcom, and another terminal of the storage capacitance Cst is also electrically coupled to the common electrode 31 to receive the common voltage Vcom.

At least one chip-bonding area 106 is formed in the periphery region 105 to bond at least one chip disposed in the at least one chip-bonding area 106 respectively. The present invention employs two chip-bonding areas 106 as an example to describe the present invention, and the present invention is not limited herein. Each of the chip-bonding areas 106 is electrically coupled to a display area 104 through a plurality of conductive lines 1061 which are arranged in a fan-out shape. A conductive loop 102 is further disposed in the periphery region 105, surrounds the display region 104 and passes through the chip-bonding areas 106. However, the conductive loop 102 is not electrically coupled to the conductive lines 1061 which are arranged in the fan-out shape. The conductive lines 1061 is arranged between each of the chip-bonding areas 106 and the display region 104 respectively, and the conductive lines 1061 are electrically coupled to the gate lines GL and the data lines SL respectively.

It can be seen from the above description that, the conductive loop 102 passes through the chip-bonding areas 106 and surrounds the display region 104. Thus, electro-static charges which are accumulated at somewhere of the display array substrate 10 in the prior art, are conducted to the whole display array substrate 10 through the conductive loop 102, and are uniformly distribute in the whole display array substrate 10 instead of somewhere of the display array substrate 10. Therefore, it can reduce the ESD damage for IC and other lines of the display array substrate 10.

Figure 3:
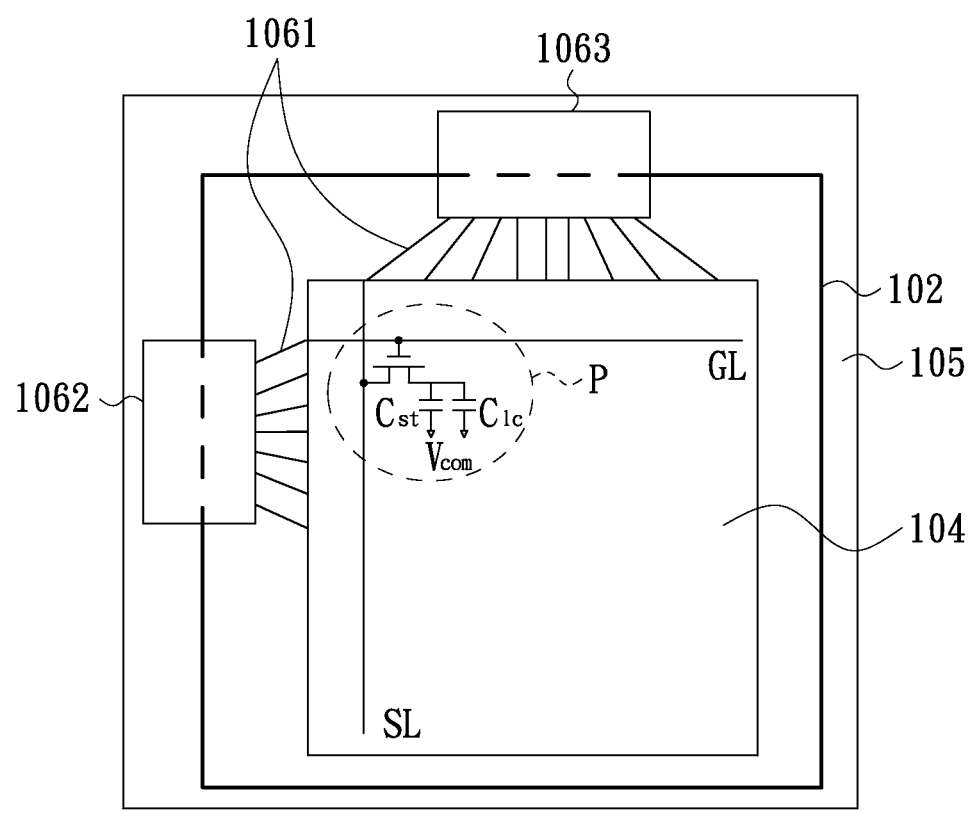
FIG. 3 is a top schematic view of the display array substrate as shown in FIG. 1, in which driving chips are disposed in the chip-bonding areas respectively.

FIG. 3 is a top schematic view of the display array substrate as shown in FIG. 1, in which driving chips are disposed in the chip-bonding areas respectively. Referring to FIG. 3, a gate-driving chip 1062 and a source-driving chip 1063 are formed in the chip-bonding areas 106 respectively, and the present invention is not limited herein. For example, there may be other driving chips formed in the chip-bonding areas 106 respectively. The gate-driving chip 1062 is electrically coupled to the corresponding conductive lines 1061 which are arranged in the fan-out shape, and is not electrically coupled to the conductive loop 102. Similarly, the source-driving chip 1063 is electrically coupled to other corresponding conductive lines 1061 which are arranged in the fan-out shape, and is not electrically coupled to the conductive loop 102. Parts of the conductive loop 102 passing through the chip-bonding areas 106 (indicated by dotted lines in FIG. 3), are arranged below the gate-driving chip 1062 and the source-driving chip 1063 respectively.

Figure 4:
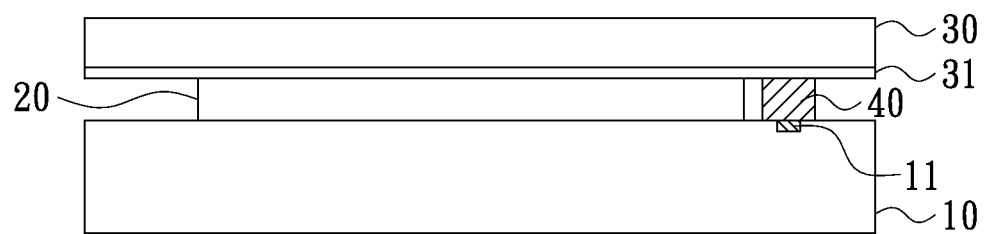
FIG. 4 is a cross-sectional schematic view of a display device in accordance with an exemplary embodiment of the present invention.

FIG. 4 is a cross-sectional schematic view of a display device in accordance with an exemplary embodiment of the present invention. Referring to FIG. 4, conductive silver glue 40 is electrically coupled to the storage capacitance Cst of each of the pixels through a conductive body 11 formed on the display array substrate 10. The conductive silver glue 40 is further electrically coupled to the common electrode 31. Therefore, it forms an electronic connection (not shown) between the conductive loop 102 and the common electrode 31 through the conductive silver glue 40.

Figure 5:
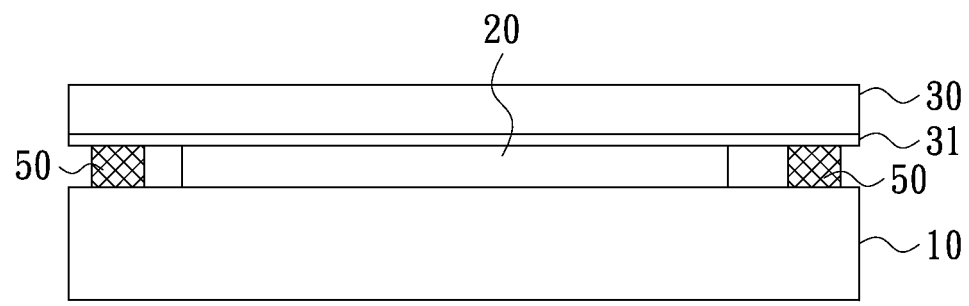
FIG. 5 is a cross-sectional schematic view of a display device in accordance with an exemplary embodiment of the present invention.

FIG. 5 is a cross-sectional schematic view of a display device in accordance with an exemplary embodiment of the present invention. Referring to FIG. 5, the common-electrode substrate 30 is bonded with the display array substrate 10 together through conductive rubber 50. Thus it forms an electronic connection (not shown) between the conductive loop 102 and the common electrode 31 through the conductive rubber 50. Herein, the conductive rubber 50 may be adhesive with conductive capability.

In the exemplary embodiments of the present invention, the conductive loop 102 may be electrically coupled to the common electrode 31 through the conductive rubber 50 or the conductive silver glue 40. Thus the electro-static charges generated in the display array substrate 10 may be discharged by the conductive loop 102 through the conductive rubber 50 or the conductive silver glue 40 to the whole common electrode 31, for further enhancing the ESD protection.

In summary, comparing with the prior art, the display device and the display array substrate 10 of the exemplary embodiment dispose the conductive loop 102 in the periphery region 105 of the display array substrate 10, and the conductive loop 102 passes through the chip-bonding areas 106, to conduct the electro-static charges accumulated somewhere of the display array substrate 10 to the whole display array substrate 10. Thus the electro-static charges may be uniformly distributed in the whole display array substrate 10, to reduce the ESD damage for IC and other lines of the display array substrate 10. In addition, the conductive loop 102 may be further electrically coupled to the common-electrode substrate 30, for further conducting the electro-static charges to the common electrode 31 which may be an unbroken piece, to further enhance the ESD protection.

In addition, it should be noted that, although the conductive loop 102 completely surrounds the display region 104 in the exemplary embodiments of the present invention, the present invention is not limited herein. The present invention may properly alter the conductive loop 102. For example, the conductive loop 102 may be designed in a large proportion of the periphery region 105 and pass through the chip-bonding areas 106, but the conductive loop 102 does not completely surround the display region 104. The conductive loop 102 may properly distribute the electro-static charges accumulated at somewhere of the display array substrate 10.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device, comprising:
    a display array substrate comprising a display region and a periphery region, at least one chip-bonding area being formed in the periphery region;
    a common-electrode substrate; and
    a display layer sandwiched between the display array substrate and the common-electrode substrate;
    wherein a conductive loop is disposed in the periphery region of the display array substrate, and passes through the chip-bonding area, the conductive loop is used to conduct and distribute electro-static charges accumulated at a portion of the display array substrate, so as to reduce an electro-static discharge damage of the display array substrate,
    wherein a common electrode is formed on the common-electrode substrate, and the conductive loop is electrically coupled to the common electrode,
    wherein a storage capacitance is formed in the display region, and a conductive body is formed in the display array substrate, a conductive silver glue is electrically coupled to the storage capacitance through the conductive body, the common electrode is electrically coupled to the storage capacitance through the conductive silver glue and the conductive body, and the conductive loop is electrically coupled to the common electrode through the conductive silver glue;
    wherein the chip-bonding area is electrically coupled to the display region through a plurality of conductive lines arranged in a fan-out shape, and the conductive loop is not electrically coupled to the conductive lines.

2. The display device according to claim 1, wherein at least one driving chip is disposed in the at least one chip-bonding area respectively, the driving chip is electrically coupled to the conductive lines arranged in the fan-out shape, and the driving chip is a gate-driving chip or a source-driving chip.

3. The display device according to claim 1, wherein the common-electrode substrate is bonded with the display array substrate by conductive rubber, and the conductive loop is electrically coupled to the common electrode through the conductive rubber.

4. The display device according to claim 1, wherein the conductive loop surrounds the display region.

5. A display array substrate, comprising:
    a display region;
    a periphery region surrounding the display region, at least one chip-bonding area being formed in the periphery region; and
    a conductive loop formed in the periphery region and passing through the chip-bonding area, the conductive loop is used to conduct and distribute electro-static charges accumulated at a portion of the display array substrate, so as to reduce an electro-static discharge damage of the display array substrate,
    wherein the chip-bonding area is electrically coupled to the display region through a plurality of conductive lines arranged in a fan-out shape, and the conductive loop is not electrically coupled to the conductive lines,
    wherein a storage capacitance is formed in the display region, and a conductive body is formed in the display array substrate, a conductive silver glue is electrically coupled to the storage capacitance through the conductive body, the common electrode is electrically coupled to the storage capacitance through the conductive silver glue and the conductive body, and the conductive loop is electrically coupled to the common electrode through the conductive silver glue.

6. The display array substrate according to claim 5, wherein at least one driving chip is disposed in the at least one chip-bonding area respectively, the driving chip is electrically coupled to the conductive lines arranged in the fan-out shape, and the driving chip is a gate-driving chip or a source-driving chip.

7. The display array substrate according to claim 5, wherein the conductive loop surrounds the display region.

* * * * *